(12) United States Patent
Hensley et al.

(10) Patent No.: US 9,956,734 B2
(45) Date of Patent: May 1, 2018

(54) HEATED LIQUID TAPERED LINE PRODUCTION DEVICE AND METHOD

(71) Applicant: SHIMANO AMERICAN CORP., Irvine, CA (US)

(72) Inventors: Brett Scott Hensley, Grand Junction, CO (US); James William Swartz, Jr., Grand Junction, CO (US); Lloyd Daniel Norlin, Grand Junction, CO (US)

(73) Assignee: SHIMANO AMERCIAN CORP., Irvine, CA (US)

( * ) Notice: Subject to any disclaimer, the term of this patent is extended or adjusted under 35 U.S.C. 154(b) by 0 days. days.

(21) Appl. No.: 15/687,259

(22) Filed: Aug. 25, 2017

(65) Prior Publication Data

US 2017/0355160 A1    Dec. 14, 2017

Related U.S. Application Data

(63) Continuation of application No. 14/210,987, filed on Mar. 14, 2014, now Pat. No. 9,776,369.

(60) Provisional application No. 61/793,712, filed on Mar. 15, 2013, provisional application No. 61/794,064, filed on Mar. 15, 2013.

(51) Int. Cl.
  *B29D 99/00*    (2010.01)
  *A01K 91/00*    (2006.01)
  *D02J 1/22*    (2006.01)

(52) U.S. Cl.
  CPC .......... *B29D 99/0078* (2013.01); *A01K 91/00* (2013.01); *D02J 1/22* (2013.01)

(58) Field of Classification Search
  CPC ........ B29D 99/0078; A01K 91/00; D02J 1/22
  USPC ...... 264/164, 178 R, 210.7, 234–235, 235.6; 425/403.1
  See application file for complete search history.

(56) References Cited

U.S. PATENT DOCUMENTS

| | | | |
|---|---|---|---|
| 2,440,226 A | 4/1948 | Swank | |
| 2,862,285 A | 12/1958 | Beebe | |
| 3,842,578 A | 10/1974 | Schippers | |
| 7,081,298 B2 | 7/2006 | Nakanishi | |
| 7,674,409 B1 * | 3/2010 | Tam | B29C 70/20 264/103 |

(Continued)

FOREIGN PATENT DOCUMENTS

| | | |
|---|---|---|
| WO | 97/34470 | 9/1997 |
| WO | 2008/046794 A2 | 4/2008 |

OTHER PUBLICATIONS

International Search Report and Written Opinion for International (PCT) Patent Application No. PCT/US2014/027348, dated Jul. 28, 2014, 10 pages.

(Continued)

*Primary Examiner* — Nahida Sultana
(74) *Attorney, Agent, or Firm* — Jeffer Mangels; Butler & Mitchell LLP; Brennan C. Swain, Esq.

(57) ABSTRACT

The present invention provides a tapered line production device and method for efficiently producing line of varying thickness. An additional aspect of the present invention is to employ a heat transfer media to provide a tapered fishing line production device and method that operates at high rates of production. Further, the device may be configured to create tapered fishing line with minimal transitional distances between tapered sections.

12 Claims, 6 Drawing Sheets

(56) References Cited

U.S. PATENT DOCUMENTS

| | | | |
|---|---|---|---|
| 8,834,763 B2* | 9/2014 | Hadba | D01F 6/62 264/176.1 |
| 9,776,369 B2 | 10/2017 | Hensley | |
| 2002/0064354 A1* | 5/2002 | Ware | G02B 6/245 385/95 |
| 2003/0121571 A1* | 7/2003 | Lagace | C21D 9/573 148/508 |
| 2004/0099985 A1* | 5/2004 | Proulx | A01D 34/4168 264/172.14 |
| 2005/0126121 A1* | 6/2005 | Tacchi | B65B 19/223 53/234 |
| 2005/0146071 A1* | 7/2005 | Tiemeier | D01D 13/00 264/103 |
| 2009/0068463 A1 | 3/2009 | Mochizuki | |
| 2009/0277755 A1* | 11/2009 | Spangler | B65G 43/10 198/617 |
| 2010/0147484 A1* | 6/2010 | Rosenthal | B21B 1/46 164/462 |
| 2011/0289766 A1* | 12/2011 | Kim | H01M 10/0404 29/623.1 |
| 2013/0015603 A1* | 1/2013 | Allen | C08G 69/265 264/234 |
| 2013/0040521 A1* | 2/2013 | Cuculo | D01D 5/084 442/181 |
| 2013/0193609 A1* | 8/2013 | Weinhold | B29C 47/0021 264/178 R |
| 2013/0239841 A1* | 9/2013 | Boren | B61B 7/06 104/112 |
| 2014/0183928 A1* | 7/2014 | Takahashi | D02J 1/22 300/19 |
| 2014/0265008 A1* | 9/2014 | Hensley | B29D 99/0078 264/164 |
| 2015/0119935 A1* | 4/2015 | Andjelic | A61L 17/12 606/230 |
| 2015/0218733 A1* | 8/2015 | Stundl | D02G 1/12 428/369 |

OTHER PUBLICATIONS

European Search Report and Written Opinion for EPO Patent Application No. 14770193.2, dated Aug. 31, 2016, 10 pages.

* cited by examiner

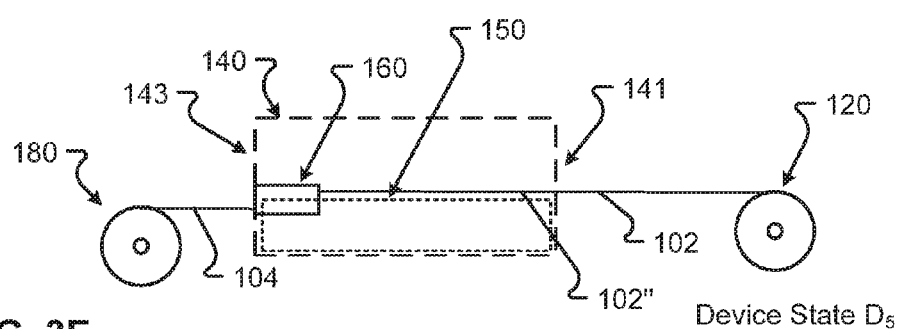
FIG. 3E  Device State D₅
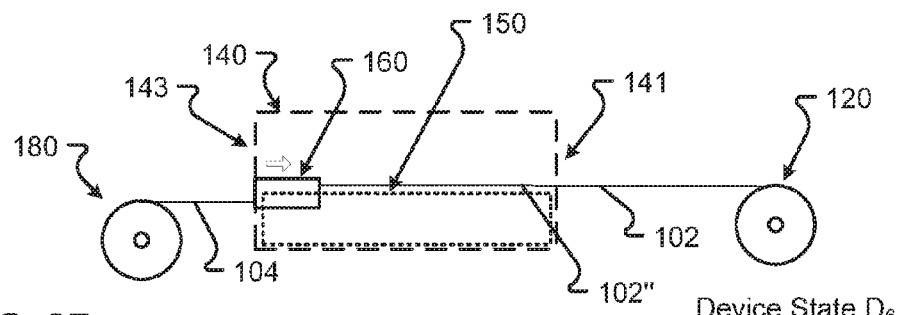
FIG. 3F  Device State D₆
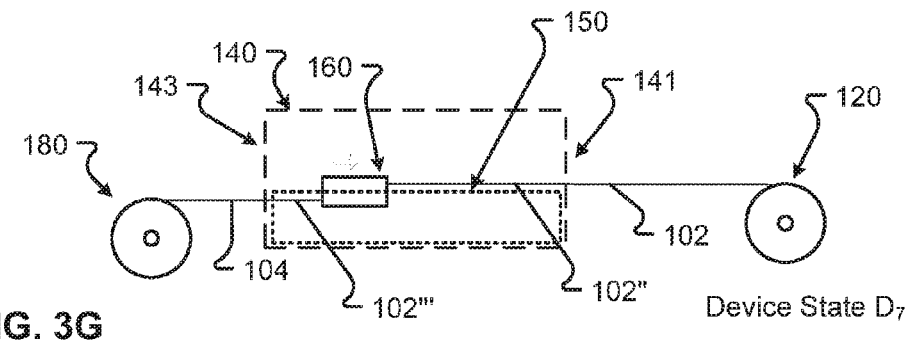
FIG. 3G  Device State D₇
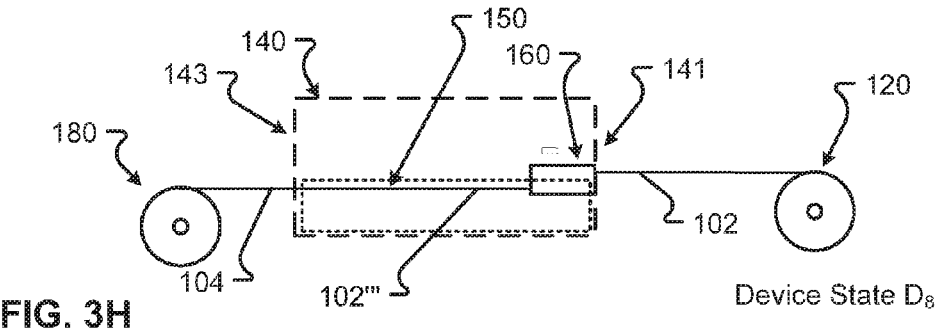
FIG. 3H  Device State D₈

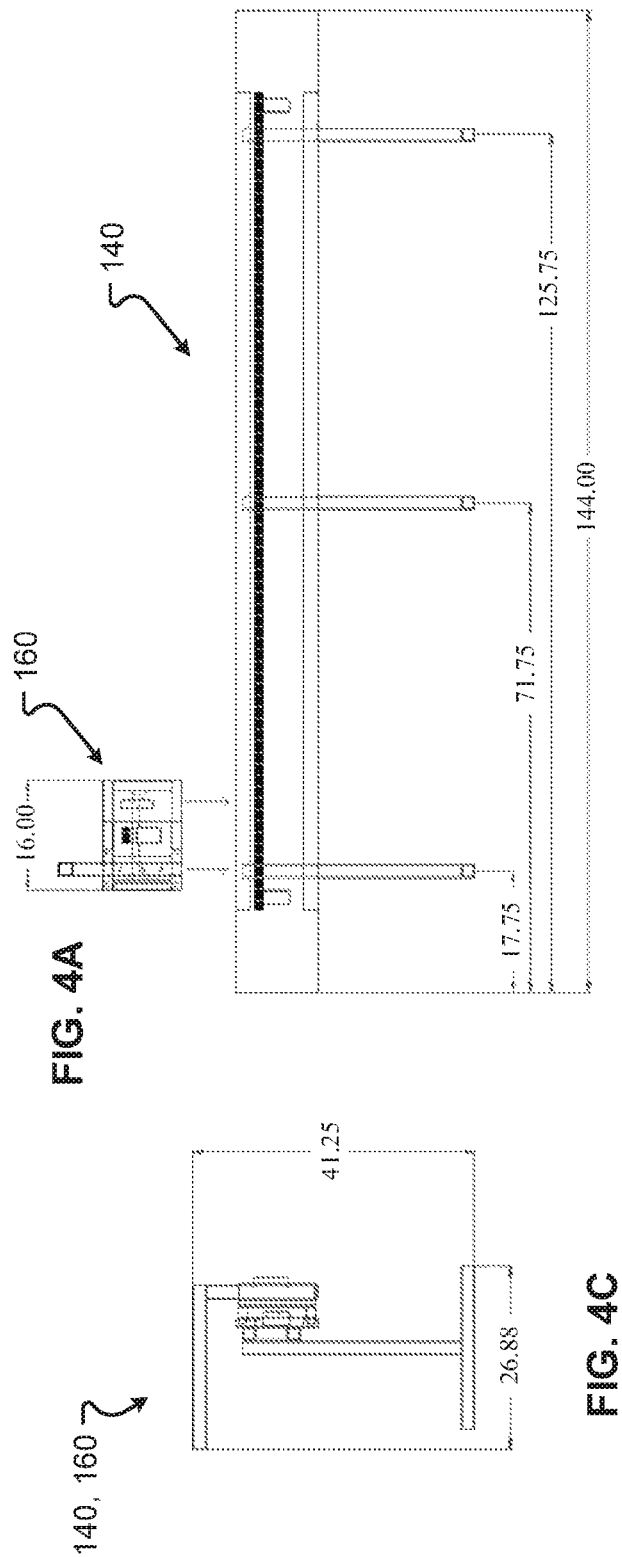

HEATED LIQUID TAPERED LINE PRODUCTION DEVICE AND METHOD

CROSS REFERENCE TO RELATED APPLICATIONS

This application is a continuation of U.S. patent application Ser. No. 14/210,987 filed Mar. 14, 2014, which claims the benefit of U.S. Provisional Patent Application Nos. 61/794,064 filed Mar. 15, 2013, and 61/793,712 filed Mar. 15, 2013, the entire disclosures of which are incorporated by reference herein.

FIELD OF THE INVENTION

Embodiments of the present invention are generally related to a tapered line production device and method and, in particular, to a device and method for efficient production of tapered fishing line through the use of heat transfer media.

BACKGROUND OF THE INVENTION

Drawing Polyethylene (PE) fiber (a process where a thermoplastic yarn is heated and elongated to result in a stronger but thinner yarn) is a well-known process, and has been used to increase strength of fibrous materials. Drawing PE fiber allows tremendous flexibility in final product sizing, oftentimes producing different products from the same feeder stock.

By changing the draw ratio during a production run, it is possible to create a tapered line that has a thick section (lower draw ratio, e.g. 1.1×) and a thinner section (higher draw ratio, e.g. 2.0×). In one example, the thick portion of the taper is 50% stronger than the thin portion.

The purpose of the thicker, stronger section is to have enough strength to offset the reduction due to making a knot. A good knot in 80 lb line breaks around 50 lbs. By creating a line with 80 lbs in a thicker section (designated for knot tying), and then tapering down to 50 lbs in the thinner section, one creates a line that has the same load carrying performance as an all 80 lb line, yet with increased capacity on the reel (and reduced drag in the water) because the line is not all at the thicker diameter. The thick/thin section may repeat, for example, every 25 feet to allow anglers to cut off only 25 feet each time they exhaust the thicker knot section of the line.

Production rates are affected by dwell time in heat transfer media. For example, if it takes 20 seconds to heat and draw braid to a desired ratio, the longer the "oven" (or heat transfer device) the faster the output. Here, the word "oven" indicates an intuitive concept of any heat transfer media. A double length of oven will allow double output speed at a given temperature. However, the draw happens throughout the length of the oven, so as long as one is making a constant diameter product there is no production penalty.

In the specific case of a tapered line of the invention, it is desired to taper from the thin portion to the thicker portion of the line within a short period or length. This requires a short oven to localize the taper. However, the throughput cost of such a short oven may be 10× slower than the regular process due to long dwell time, thus resulting in a cost-prohibitive process. With the invention herein disclosed, a reduced processing time to between 2× to 3× is achieved.

Therefore, there is a long-felt need for a production device and method that can efficiently and effectively yield a tapered line of varying thickness. The present device and method of operation addresses and solves these needs. The present invention relates to a device and method for efficient production of tapered fishing line through the use of heat transfer media. The device and method allow, among other things, a means to create tapered fishing line with minimal transitional distances between tapered sections and may operate at higher rates of production than conventionally provided.

By way of providing additional background and context, the following reference is incorporated by reference in its entirety for the purpose of explaining various methods of tapering fishing lines: U.S. Pat. No. 7,081,298 to Nakanishi.

SUMMARY OF THE PREFERRED EMBODIMENTS

It is one aspect of the present invention to provide a programmable, movable trolley assembly that allows for relatively quick and drastic draw ratio changes in line, such as braided superline, without negatively impacting processing speeds is disclosed. The trolley interfaces with the line at the point of entry into the heat transfer media. Nominal thickness line is produced at a nominal draw ratio by passing line through a heat transfer media. The line enters the upper portion of a trolley device positioned proximal the heat transfer media. The line then is routed to a lower portion of the trolley where it is immersed in the heat transfer media. The line exits the heat transfer media having been stretched or drawn to a thinner diameter. During this process, the trolley is stationary at a first or entry end of the heat transfer media. To produce a line portion which is relatively thicker than the nominal thickness line, the trolley moves with the line from the first or entry end of the heat transfer media toward the second or exit end of the heat transfer media. The trolley travels down all or some of the length of the heat transfer media with the line at the desired point of draw ratio decrease to delay entry of any new length of braid into the heat transfer media. The trolley also allows the length of braid already in the tank to continue to be drawn to its maximum length. The trolley then stops at a pre-determined point along the heat transfer media length (which may include the second or exit end of the heat transfer media) to allow un-drawn material to enter a shorter length of heat transfer media, thus experiencing a shorter draw rate (and thus produce a relatively thicker diameter line). The trolley then returns to its original location to repeat the process. In this way, a line with variable thickness is produced.

Stated another way:

Step 1: The braided line running on the machine is run through the full length of heat transfer media and stretched to the maximum desired elongation ratio at the maximum preferred input speed.

Step 2: When the point of the braid where the desired decreased draw ratio length is located begins to pass through the trolley device and into the heat transfer media (located at the input end of the heat transfer media), the trolley begins to move through the heat transfer media at the exact input speed of the braid until it reaches the desired location along the heat transfer media length. At the same time, the output speed of the rollers retrieving the braid out of the heat transfer media begins to decrease to the desired low-draw ratio speed at a rate equal to that of the travel time of the interface device.

Step 3: A length of braid enters the heat transfer media and is exposed to a shorter length of heat transfer media and drawn to its desired smaller draw ratio using the same preferred input speed as in Step 1.

Step 4: When the point of the braid where the desired draw ratio increase is located begins to pass through the trolley (now located toward the output side of the heat transfer media), the trolley begins to move through the heat transfer media at the maximum speed possible to its original position at the input end of the heat transfer media. At the same time, the output speed of the rollers retrieving the braid out of the heat transfer media begins to increase up to the original maximum-draw speed at a rate equal to that of the travel time of the interface device.

Step 5: Repeat, i.e. return to Step 1.

In one embodiment of the invention, a tapered line production device is disclosed, the tapered line production device comprising: a body having a first side, a second side, and a heat transfer assembly positioned therein, the heat transfer assembly adapted to selectively provide thermal energy to a line passing through the heat transfer assembly from the first side to the second side; an input roller operating at a first rate that delivers line to the first side; an output roller operating at a nominal second rate that receives line from the second side; and a moveable trolley assembly engaged with the body, the trolley assembly configured to controllably position the line to selectively engage or not engage with the heat transfer assembly.

In another embodiment of the invention, a method of producing tapered line is disclosed, the method comprising: providing a device having a body with a first side, a second side, and a heat transfer assembly positioned therein, the heat transfer assembly adapted to selectively provide thermal energy to a line passing through the heat transfer assembly between the first side to the second side; providing a moveable trolley assembly engaged with the body, the trolley assembly configured to controllably position the line to selectively engage or not engage with the heat transfer assembly; receiving the line at the first side by an input roller operating at a first rate; passing the line through the heat transfer assembly so as to elongate the line; outputting a first portion of the line from the second side by an output roller operating at a nominal second rate wherein the first portion of the line has a first diameter; moving the trolley assembly from the first side to the second side at a first speed approximately equal to the first rate wherein the line does not pass through the heat transfer assembly; operating the output roller at a decreasing rate from the nominal second rate to approximately the first rate as the trolley traverses the length of the body from the first side to the second side; outputting a second portion of the line from the second side wherein the second portion of the line has a second diameter larger than the first diameter; wherein a tapered line is produced.

In one aspect of the invention, the device and/or method further comprises a controller, which may comprise a Programmable Logic Controller, which controls at least one of the input roller, output roller and trolley. In one embodiment of the invention, the nominal second rate of the output roller is greater than the first rate of the first roller. In another aspect of the invention, the trolley is configured to traverse at least a portion of the length of the body from the first side to the second side at a first speed, and/or wherein the first speed may be approximately the speed of the line delivered to the first side, and/or wherein as the trolley traverses the length of the body from the first side to the second side, the output roller decreases from the nominal second rate to approximately the first rate and/or wherein the trolley is configured to traverse the length of the body from the second side to the first side at a second speed, and/or a plurality of lines are delivered to the first side. In another aspect of the invention, the line comprises polyethylene, and/or the heat transfer media is a resin bath, and/or the first speed is selectable by a user. In one embodiment of the invention, as the trolley traverses the length of the body from the first side to the second side, the nominal second rate of the output roller remains constant while the first rate of the input roller varies. In another embodiment of the invention, as the trolley traverses the length of the body from the first side to the second side, the nominal second rate of the output roller varies and the first rate of the input roller varies.

In another embodiment of the invention, a tapered line production system is disclosed, the method comprising: a body having a first side, a second side, and a heat transfer assembly positioned therein, the heat transfer assembly adapted to selectively provide thermal energy to a line passing through the heat transfer assembly from the first side to the second side; an input roller operating at a first rate that delivers line to the first side; an output roller operating at a nominal second rate that receives line from the second side, the nominal second rate greater than the first rate; a moveable trolley assembly engaged with the body, the trolley assembly configured to controllably position the line to selectively engage or not engage with the heat transfer assembly while the trolley traverses at least a portion of the body from the first side to the second side at a first speed; and a controller which controls at least one of the input roller, output roller and trolley; wherein the first speed is approximately the speed of the line delivered to the first side; wherein as the trolley traverses the length of the body from the first side to the second side, the output roller decreases from the nominal second rate to approximately the first rate; wherein the line comprises polyethylene, fluorocarbon, nylon, olefins, polyester, and thermoplastic and is configured as at least one of monofilament, co-filament, multi-filament, twisted, braided, thermally-fused and chemically-fused line; and wherein the heat transfer media is a resin bath.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "line" or "braided line" shall mean any cord that has elastic properties and may be stretched, without breaking, such as by a source of thermal energy. Line shall include, without limitation, fishing lines and lines comprising polyethylene, fluorocarbon, nylon, olefins, polyester, and other thermoplastic materials in multi-filament or monofilament forms. Line shall include, without limitation, twisted, braided, co-filament, monofilament and thermally-fused or chemically-fused lines (also known as "super-lines").

The term "resin" shall mean any liquid substance that will set into a solid substance, to include, without limitation, synthetic or natural or organic resins.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

It is important to note that the transition length from long draw ratio to short draw ratio or short draw ratio to long draw ratio is directly related to the length of braid in the heat transfer media at the time of draw ratio transition. To achieve a short transition length the braid length exposed in the heat transfer media must be short. Alternately, the shorter the braid length in the heat transfer media, the lower the processing speed. The movable trolley allows one to maximize processing speed and minimize the transition lengths by adjusting the braid length in the heat transfer media depending on process step.

One of ordinary skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, carbon fiber, ABS plastic, polyurethane, and other fiber-encased resinous materials, synthetic materials, polymers, and natural materials.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claims set forth herein, taken in conjunction with this Summary, define the invention.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

FIGS. 3A-H are schematic representations of various states of the device in one embodiment;

FIGS. 4A-C are an example construction of a portion of the device in one preferred embodiment.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION OF THE PREFERRED EMBODIMENTS

FIGS. 1-5 show various embodiments of the Device 100 of the present invention.

Figure 1:
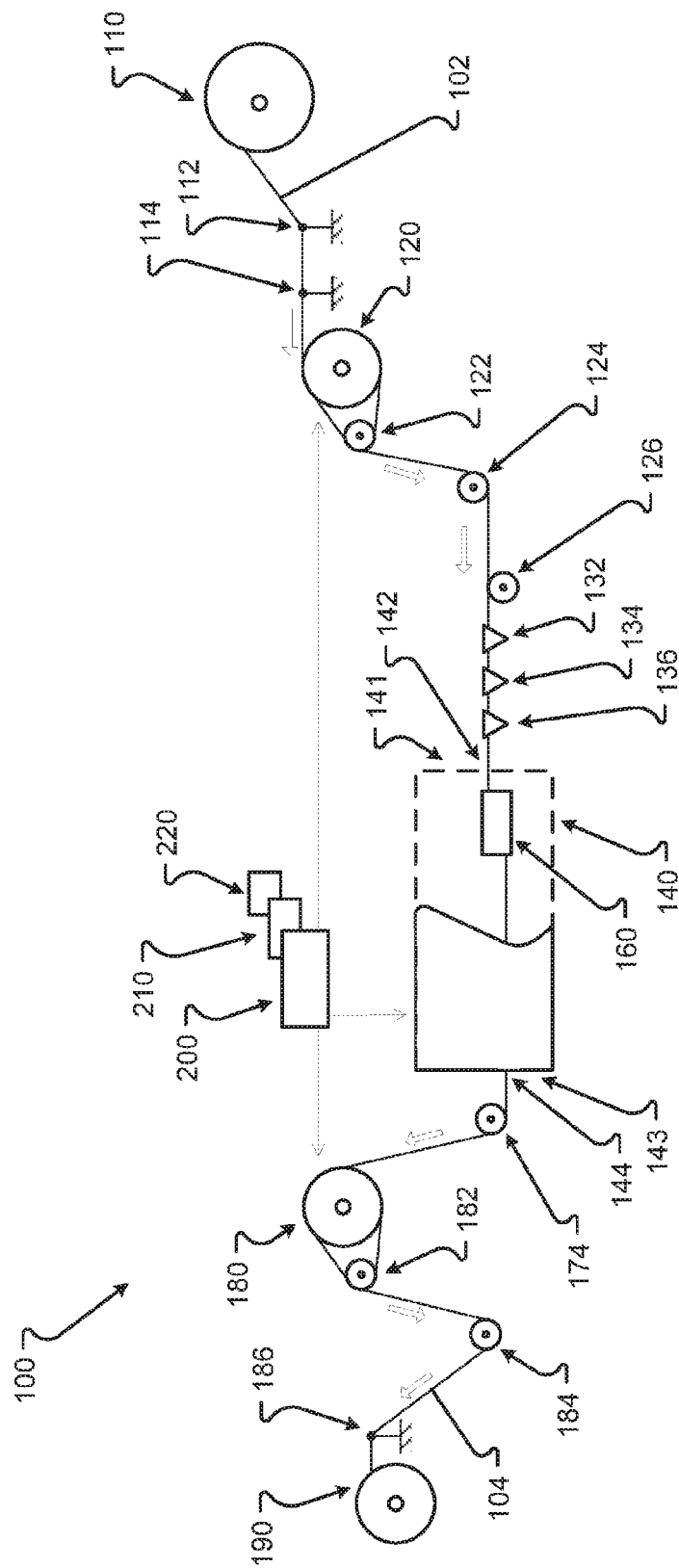
FIG. 1 depicts a schematic representation of the device of the invention in one preferred embodiment.
Figure 2:
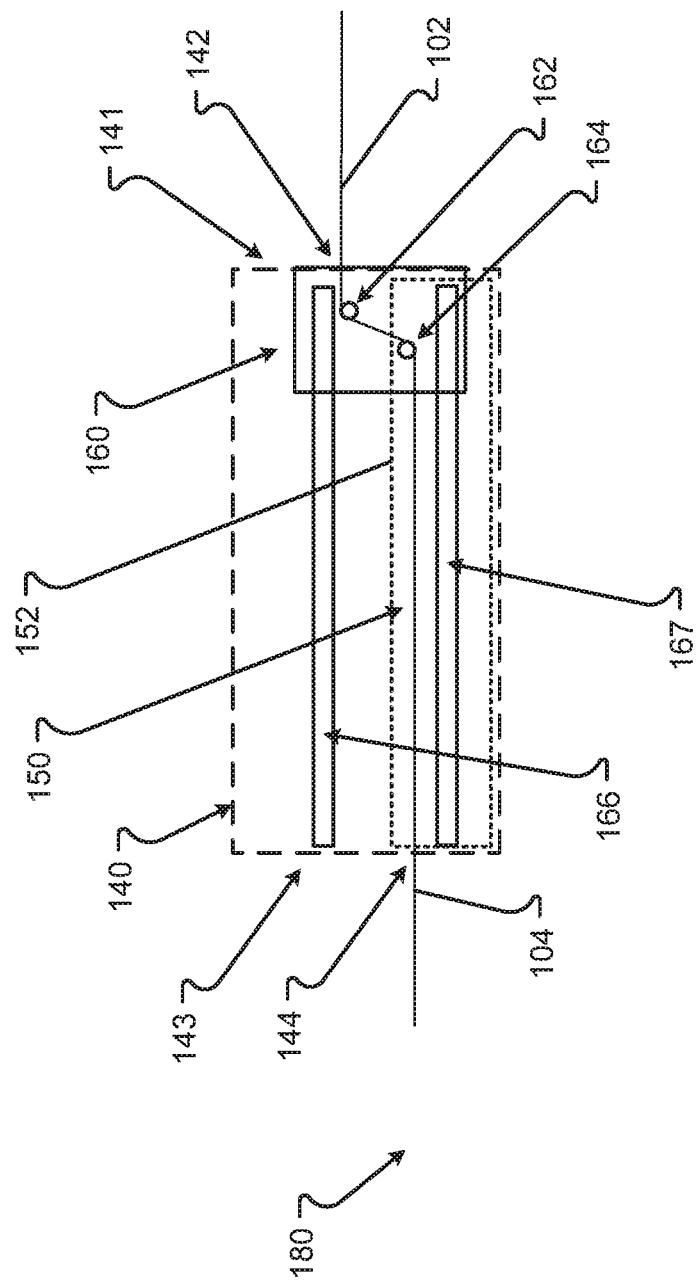
FIG. 2 is a cut-away side-view of a representation of a portion of the device in one preferred embodiment.

FIGS. 1 and 2 depict schematic representations of the Device 100 of the invention in one preferred embodiment. Generally, the Device 100 comprises a Feeder Stock Spool 110, which provides raw braid Line 102 to the Device 100. The Line 102 unwinds and travels along the direction of the arrows shown, i.e. generally right to left. The Line 102 travels through two consecutive Loop One 112 and Loop Two 114. In other embodiments of the invention, no such loops are employed, or a different number of such loops are employed, such as one or a plurality of loops. The Line 102 then travels to Input Roller 120 which is in communication with Controller 200. The Controller 200 also may be in communication with one or more of the Output Roller 180, Trolley 160, and Heat Transfer Assembly 140. The Controller 200 may be a Programmable Logic Control (PLC) or any controller known to those skilled in the art. For example, any digital or analog control that may, among other things, comprise controlling the speed (RPM) of the Input Roller 120, the speed (RPM) of the Output Roller 180, positioning (to include speed) of the Trolley 160, and thermal parameters (such as temperature) of the Heat Transfer Assembly 140. After engaging the Input Roller 120, the Line 102 engages Roller One 122, Roller Two 124 and Roller Three 126. In other embodiments of the invention, no such rollers are employed, or a different number of such rollers are employed, such as one or a plurality of rollers.

Line 102 continues in a generally right to left direction to optionally engage one or more inking stations. FIG. 1 depicts Line 102 engaging a sequence of Inking Station One 132, Inking Station Two 134 and Inking Station 136. The Line 102 is colored or inked during engagement with the one or more inking stations.

The Line 102 then enters the Heat Transfer Assembly 140, comprising a Heat Transfer Assembly First End 141 with Heat Transfer Assembly Line Input End 142 (where Line 102 enters the Heat Transfer Assembly 140), and Heat Transfer Assembly Second End 143 with Heat Transfer Assembly Line Output End 144 (where Line 102 exits the Heat Transfer Assembly 140). Within the Heat Transfer Assembly 140 the Line 102 engages the Trolley 160 and may pass through a portion of the Heat Transfer Volume 150 comprising a Heat Transfer Volume Upper End 152.

Upon exiting the Heat Transfer Assembly 140, the former Line 102, having passed through the Heat Transfer Assembly 140, is deemed Finished Line 104. The Finished Line 104 optionally engages Roller Four 174 before engaging Output Roller 180. Output Roller 180, by adjusting its rotational speed (that is RPM), generally determines the amount of time a particular portion of Line 102 will remain within Heat Transfer Assembly 140, which determines the diametrical thickness of Finished Line 104. A tapered product will have Finished Line 104 of varying thickness, e.g. thick to thin to thick.

After engaging Output Roller 180, Finished Line 104 may optionally engage one or more of Roller Five 182, Roller Six 184 and Loop Three 186 before engaging Take-up Reel or Spool 190. The Finished Line 104 is gathered at Take-up Reel 190. In one embodiment, the Take-up Reel 190 comprises a clutch mechanism.

In one embodiment, the Input Roller 120 and Roller One 122 are an integrated assembly in which Line 102 winds around both elements before continuing downstream of the Device 100 (i.e. generally right to left and toward the Heat Transfer Assembly 140). More specifically, the Input Roller 120 and Roller One 122 are an integrated assembly commonly called a Godet Roller by one skilled in the art. A Godet Roller enables, among other things, tension to be applied to the assembly of Input Roller 120 and Roller One 122 without imparting tension upstream, e.g. to the Stock Spool 110. Similarly, in one embodiment, the Output Roller 180 and Roller Five 182 are an integrated assembly in which Line 104 winds around both elements before continuing downstream of the Device 100 (i.e. generally right to left and toward the Take-up Reel 190). More specifically, the Output Roller 180 and Roller Five 182 are an integrated assembly such as a Godet Roller.

The device 100 comprises a Controller Display 210 and a Motor 220. In one embodiment, the Motor 220 is a DC motor, although any means of driving one or more of the Input Roller 120, Output Roller 180, and Trolley 160 may be employed.

Specifically as depicted in FIG. 2, Trolley 160 comprises a Trolley Upper Wheel 162 which receives Line 102 through Heat Transfer Assembly Line Input End 142 and routes the line to Trolley Lower Wheel 164 before directing the line out of Heat Transfer Assembly 140 via Heat Transfer Assembly Line Output End 144. Note that the line leaving Trolley Lower Wheel 164 is below the Heat Transfer Volume Upper End 152 and therefore is contained within the Heat Transfer Volume 150.

Trolley 160 may be driven within the Heat Transfer Assembly 140 by any means known to those skilled in the art, to include one or more rails. For example, two linear rails may be employed as shown in FIG. 2 as Trolley Lower Rail Assembly 166 and Trolley Lower Rail Assembly 167.

The Heat Transfer Assembly 140 may be any means known to those skilled in the art to provide thermal transfer, to include ovens such as convection ovens, liquids, and gases to include heated air. In one embodiment, the Heat Transfer Assembly 140 may comprise heated surfaces, such as heated rollers, which engage the line.

In one preferred embodiment, the Heat Transfer Assembly 140 operates between approximately 120 degree and 180 degree Celsius. In a more preferred embodiment, Heat Transfer Assembly 140 operates between approximately 130 degree and 170 degree Celsius.

In another preferred embodiment, the Heat Transfer Assembly 140 operates at approximately 150 degree Celsius.

In one embodiment, the Heat Transfer Assembly 140 comprises a plurality of individually-controlled heat or temperature zones. The temperature zones may be any combination of multiple horizontally-spaced or separated temperature zones or vertically-spaced or separated temperature zones. Such zones, among other things, create different draw ratios for line immersed therein, thereby creating different relative line thicknesses.

In one embodiment, the Heat Transfer Assembly 140 is a resin bath, such as a wax bath or wax resin bath.

Referring to FIGS. 3A-H, a schematic representation of various states of the Device 100 is provided. Generally, Line 102 travels from Input Roller 120 into Heat Transfer Assembly 140 and to Output Roller 180. Within the Heat Transfer Assembly 140, Line 102 engages Trolley 160 and may engage (i.e. pass through) a portion of Heat Transfer Volume 150.

The amount of time a given portion of Line 102 engages the Heat Transfer Volume 150 (i.e. the "dwell time) determines the potential relative thickness of the diameter of Line 102. A portion of Line 102 engaging a greater amount of Heat Transfer Volume 150 (i.e. a Line 102 with a relatively longer or greater dwell time) may become more elongated (drawn farther) and thus thinner than a portion of Line 102 that engages the same Heat Transfer Volume 150 for a shorter amount of time (ie. a shorter or smaller dwell time with less draw potential).

The device 100 allows a given input Line 102 to receive differing dwell times and therefore result in a Line 102 of differing elongation or diametrical thickness. A sequence of sequential states $D_N$ of the Device 100 is provided in FIGS. 3A-H, where N=1 through 8. Also shown in FIGS. 3A-H are states $T_N$ of the Trolley 160 and states $O_N$ of the Output Roller 180. Input Roller 120 typically operates at a constant speed.

Device State $D_1$ (FIG. 3A)
  $T_1$: Trolley 160 stationary at Heat Transfer Assembly First End 141
  $O_1$: Output Roller 180 operating at a constant, maximum preferred speed (e.g. $O_{MAX}$)
  Line Engaged with Heat Transfer Assembly 102' being elongated to maximum elongation (thus becoming thinner relative to input Line 102 upstream of Heat Transfer Assembly 140)

Device State $D_2$ (FIG. 3B)
  $T_2$: Trolley 160 departs from Heat Transfer Assembly First End 141 at speed $T_{SET}$ (i.e. begins to move from right to left)
  $O_2$: Output Roller 180 begins to decrease in rotational speed (i.e. RPM) from the maximum preferred speed (i.e. $O_{MAX}$); rate of speed decrease is approximately determined by Trolley travel time from Heat Transfer Assembly First End 141 to Heat Transfer Assembly Second End 143
  Line Engaged with Heat Transfer Assembly 102' being elongated to maximum elongation (thus becoming relatively thinner)

Device State $D_3$ (FIG. 3C)
  $T_3$: Trolley 160 continues away from Heat Transfer Assembly First End 141 at speed $T_{SET}$
  $O_3$: Output Roller 180 continues to decrease in speed from the maximum preferred speed (i.e. $O_{MAX}$); rate of speed decrease is approximately determined by Trolley travel time from Heat Transfer Assembly First End 141 to Heat Transfer Assembly Second End 143

Line Engaged with Heat Transfer Assembly 102' being elongated to maximum elongation (thus becoming relatively thinner)

Line Affixed Atop Trolley 102" is not engaged with Heat Transfer Assembly 140 and thus is not undergoing elongation (thus remaining at its nominal diameter and thus relatively thicker with respect to Line Engaged with Heat Transfer Assembly 102')

Figure 3A:
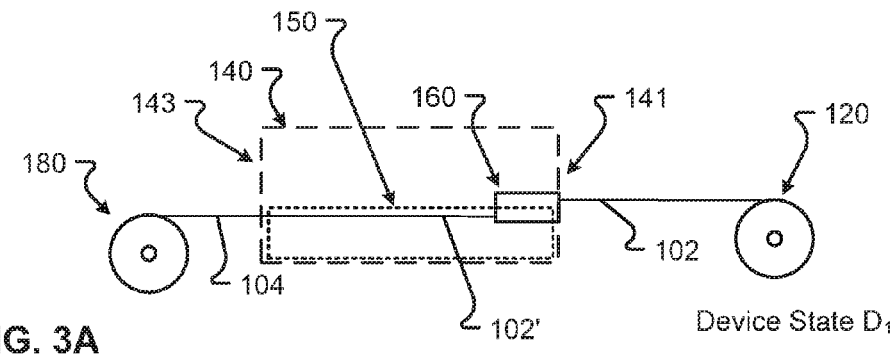
Figure 3B:
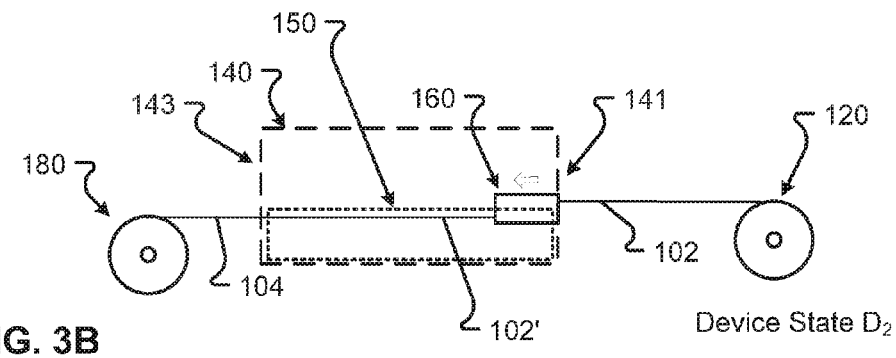
Figure 3C:
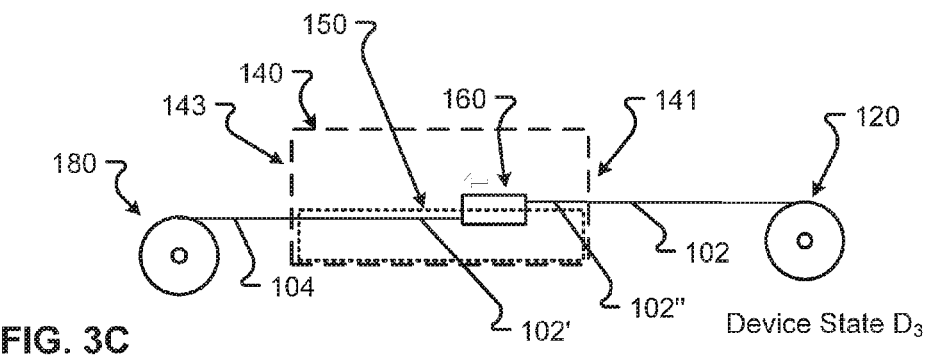
Figure 3D:
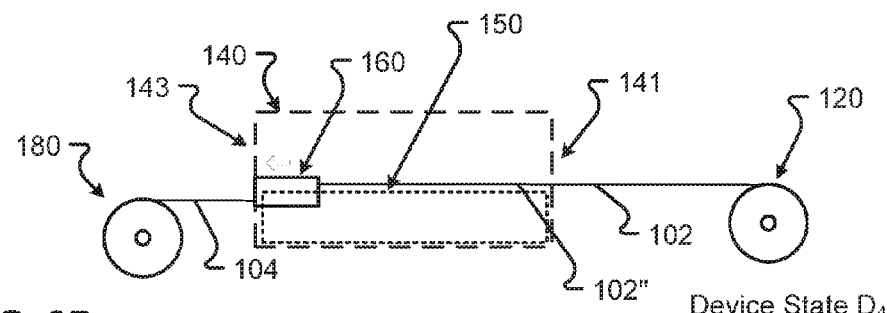

Device State $D_4$ (FIG. 3D)

$T_4$: Trolley 160 reaches Heat Transfer Assembly Second End 143

$O_4$: Output Roller 180 reaches minimum preferred speed (i.e. $O_{MIN}$)

All of Line Affixed Atop Trolley 102", spanning length of Heat Transfer Assembly 140, remains atop Trolley 160 and none of Line Atop Trolley 102" has engaged with Heat Transfer Assembly 140 and thus is not elongated (thus remaining at its nominal diameter and thus relatively thicker with respect to Line Engaged with Heat Transfer Assembly 102')

Device State $D_5$ (FIG. 3E)

$T_5$: Trolley 160 momentarily stops at Heat Transfer Assembly Second End 143

$O_5$: Output Roller 180 now operating at steady minimum preferred speed (i.e. $O_{MIN}$)

All of Line Affixed Atop Trolley 102", spanning length of Heat Transfer Assembly 140, remains atop Trolley 150 and none of Line Atop Trolley 102" has engaged with Heat Transfer Assembly 140 and thus is not elongated (thus remaining at its nominal diameter and thus relatively thicker with respect to Line Engaged with Heat Transfer Assembly 102')

Device State $D_6$ (FIG. 3F)

$T_6$: Trolley 160 departs Heat Transfer Assembly Second End 143 at speed $T_{RETURN}$ toward Heat Transfer Assembly First End 141 (i.e. begins to move left to right)

$O_6$: Output Roller 180 begins to accelerate from minimum preferred speed (i.e. $O_{MIN}$)

Former Line Affixed Atop Trolley 102''' begins to engage with Heat Transfer Assembly 140 and thus begins to undergo elongation proportional to dwell time of particular portion of Former Line Atop Trolley 102'''

Device State $D_7$ (FIG. 3G)

$T_7$: Trolley 160 continues toward Heat Transfer Assembly First End 141 at speed $T_{RETURN}$ $O_7$: Output Roller 180 continues to accelerate from minimum preferred speed (i.e. $O_{MIN}$) to maximum preferred speed (i.e. $O_{MAX}$)

Former Line Atop Trolley 102''' continues to engage with Heat Transfer Assembly 140 and continues to undergo elongation proportional to dwell time of particular portion of Former Line Atop Trolley 102'''

Device State $D_8$ (FIG. 3H)

$T_8$: Trolley 160 arrives at Heat Transfer Assembly First End 141

$O_8$: Output Roller 180 reaches maximum preferred speed (i.e. $O_{MAX}$)

End of Former Line Atop Trolley 102''' reaches Heat Transfer Assembly Second End 143; all line upstream (i.e. to the right) of Former Line Affixed Atop Trolley 102''' will be Line Engaged with Heat Transfer Assembly 102'

(Trolley 160 idles, i.e. remains stationary, at Heat Transfer Assembly First End 141 for Trolley Idle Time $T_{IDLE}$—this is Device State 1—thus beginning a new cycle of Device States $D_{1 \rightarrow 8}$)

FIGS. 4A-C are an example construction of a portion of the device in one preferred embodiment. This figure is to scale; all dimensions are in inches.

Figure 5:
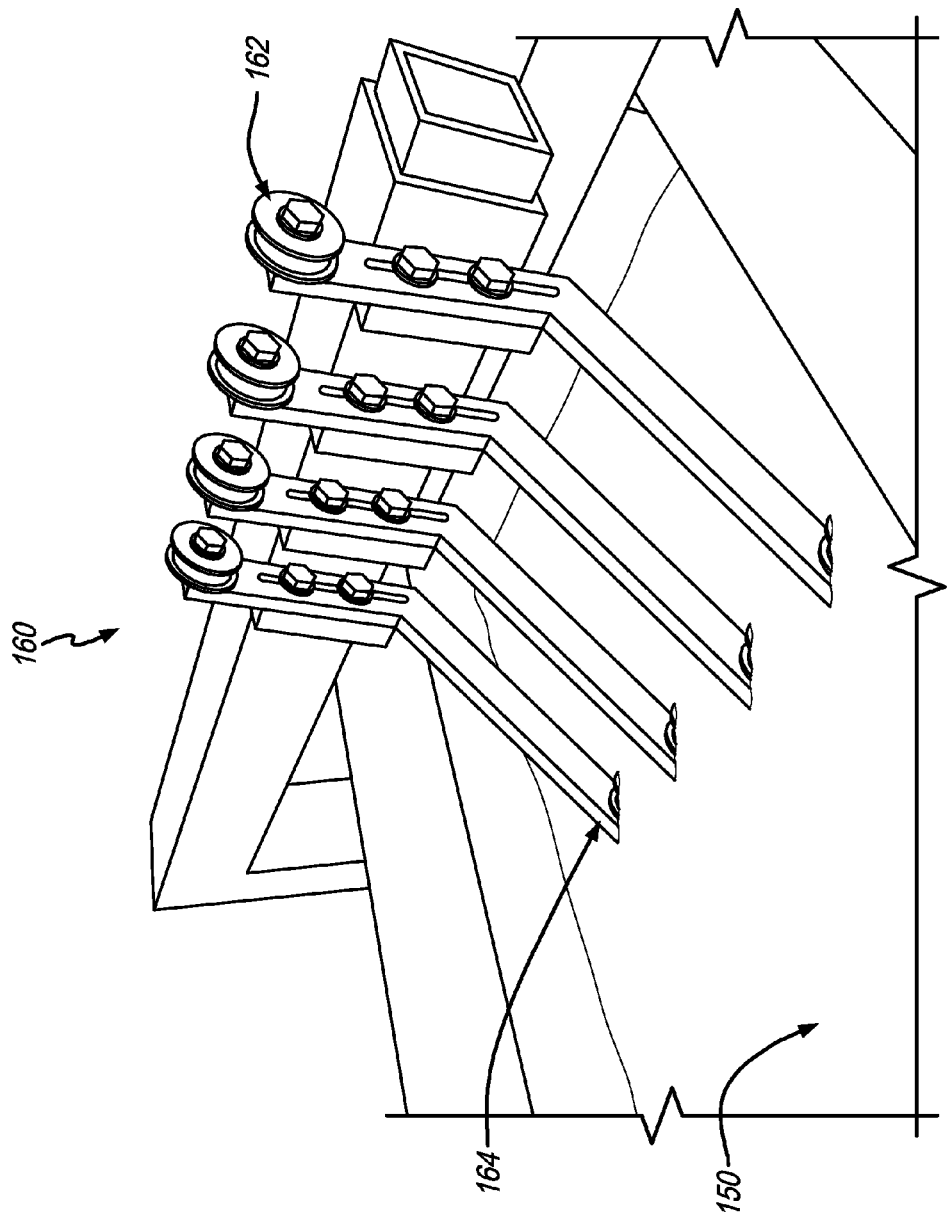
FIG. 5 is an example construction of a portion of the device in one preferred embodiment. This figure is to scale.

FIG. 5 is an example construction of a portion of the device in one preferred embodiment. This figure is to scale.

The invention may use other than polyethylene (PE) fiber as a line. For example, any linearly oriented polymeric structure, braided, twisted or otherwise constructed linear fibrous assembly, thermally fused line, monofilament and those lines known to one skilled in the art that may be manipulated through application of thermal energy, to include manipulation such as tapering, may be used.

In another embodiment, rather than decreasing the rate of the output roller from the nominal second rate to approximately the first rate as the trolley traverses the length of the body from the first side to the second side, the same relative change in rate (and thus yielding the same tapered effect) between the input and output rollers is achieved by varying one or both of the input and output rollers. That is, in one embodiment of the invention, when the Trolley 160 traverses the length of the Heat Transfer Assembly 140 from the first side to the second side, the second rate of the Output Roller 180 remains constant while the first rate of the Input Roller 120 varies. In another embodiment of the invention, when the Trolley 160 traverses the length of the Heat Transfer Assembly 140 from the first side to the second side, the second rate of the Output Roller 180 varies and the first rate of the Input Roller 120 also varies.

In one embodiment, one or more computers are used to control, among other things, the RPM (rate) of the input roller, the RPM (rate) of the output roller, the movement and positioning of the trolley, the temperature of the heat transfer assembly, and the RPM (rate) of the stock spool. In one embodiment, a user selectively inputs one or more of the RPM of the input roller, the RPM of the output roller, the movement and positioning of the trolley, the temperature of the heat transfer assembly, and the RPM of the stock spool.

The user may engage with device and/or controller through a display. The term "display" refers to a portion of one or more screens used to display the output of a computer to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen. A display may have the capability to record and/or print display presentations and display content, such as reports.

In one embodiment, the user interacts with the computer through any means known to those skilled in the art, to include a keyboard and/or display to include a touch-screen display. The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magnetooptical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Computer processing may include any known to those skilled in the art, to include desktop personal computers, laptops, mainframe computers, mobile devices and other computational devices.

In yet another embodiment, the disclosed systems and methods may be partially implemented in software that can be stored on a storage medium to include a computer-readable medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Communications means and protocols, such as those used to communicate between a user display and controller, may include any known to those skilled in the art, to include cellular telephony, internet and other data network means such as satellite communications and local area networks. As examples, the cellular telephony can comprise a GSM, CDMA, FDMA and/or analog cellular telephony transceiver capable of supporting voice, multimedia and/or data transfers over a cellular network. Alternatively or in addition, other wireless communications means may comprise a Wi-Fi, BLUETOOTH™, WiMax, infrared, or other wireless communications link. Cellular telephony and the other wireless communications can each be associated with a shared or a dedicated antenna. Data input/output and associated ports may be included to support communications over wired networks or links, for example with other communication devices, server devices, and/or peripheral devices. Examples of input/output means include an Ethernet port, a Universal Serial Bus (USB) port, Institute of Electrical and Electronics Engineers (IEEE) 1394, or other interface. Communications between various components can be carried by one or more buses.

As will be appreciated, it would be possible to provide for some features of the inventions without providing others.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. For example, the steps may be performed in any order and are not limited to the particular ordering discussed herein.

| Reference No. | Component |
| --- | --- |
| 100 | Device |
| 102 | Line |
| 102' | Line Engaged with Heat Transfer Assembly |
| 102" | Line Affixed Atop Trolley |
| 102''' | Former Line Affixed Atop Trolley |
| 104 | Finished Line |
| 110 | Feeder Stock Spool |
| 112 | Loop One |
| 114 | Loop Two |
| 120 | Input Roller |
| 122 | Roller One |
| 124 | Roller Two |
| 126 | Roller Three |
| 132 | Inking Station One |
| 134 | Inking Station Two |
| 136 | Inking Station Three |
| 140 | Heat Transfer Assembly |
| 141 | Heat Transfer Assembly First End |
| 142 | Heat Transfer Assembly Line Input End |
| 143 | Heat Transfer Assembly Second End |
| 144 | Heat Transfer Assembly Line Output End |
| 150 | Heat Transfer Volume |
| 152 | Heat Transfer Volume Upper End |
| 160 | Trolley |
| 162 | Trolley Upper Wheel |
| 164 | Trolley Lower Wheel |
| 166 | Trolley Upper Rail Assembly |
| 167 | Trolley Lower Rail Assembly |
| 174 | Roller Four |
| 180 | Output Roller |
| 182 | Roller Five |
| 184 | Roller Six |
| 186 | Loop Three |
| 190 | Take-up Reel |

-continued

| Reference No. | Component |
| --- | --- |
| 200 | Controller |
| 210 | Controller Display |
| 220 | Motor |
| $D_N$ | Device State N |
| $T_{IDLE}$ | Trolley Idle Time |
| $T_N$ | Trolley State N |
| $T_{RETURN}$ | Trolley Return Speed |
| $T_{SET}$ | Trolley Set Speed |
| $O_N$ | Output Roller State N |
| $O_{MIN}$ | Output Roller Minimum Speed |
| $O_{MAX}$ | Output Roller Maximum Speed |

What is claimed is:

1. A tapered line production device, comprising:
   a tank that includes an entrance end, an exit end and a heat transfer media disposed therein, wherein the heat transfer media is adapted to provide thermal energy to a line passing through at least a portion of the heat transfer media,
   an upper line guide member positioned above the heat transfer media,
   a lower line guide member positioned within the heat transfer media, and
   a trolley assembly associated with and moveable with respect to the tank, wherein the upper and lower line guide members are associated with the trolley assembly,
   wherein the line extends from the upper line guide member above the heat transfer media to the lower guide member, such that the line is immersed in the heat transfer media, and passed the exit end of the tank.

2. The tapered line production device of claim 1 further comprising an input roller operating at an input rate that delivers line to the entrance side, and
   an output roller operating at an output rate that receives line from the exit side.

3. The tapered line production device of claim 2 wherein the output rate is different than the input rate.

4. The tapered line production device of claim 1 wherein the trolley assembly is moveable from a first position where the line is immersed in the heat transfer media at a first location to a second position wherein the line is immersed in the heat transfer media at a second location.

5. The tapered line production device of claim 1 wherein the trolley assembly is configured to move from the entrance end of the tank toward the exit end of the tank.

6. The tapered line production device of claim 5 further comprising an input roller operating at an input rate that delivers line to the entrance side, and
   an output roller operating at an output rate that receives line from the exit side.

7. The tapered line production device of claim 6 wherein when the trolley assembly moves from the entrance side toward the exit side, the output rate remains constant and the input rate varies.

8. The tapered line production device of claim 6 wherein when the trolley assembly moves from the entrance side toward the exit side, the output rate varies and the input rate varies.

9. The tapered line production device of claim 6 wherein the trolley assembly is configured to move from the entrance side toward the exit side at a first speed, and wherein the first speed is approximately the speed of the line delivered to the entrance side.

10. The tapered line production device of claim 6 wherein when the trolley assembly moves from the entrance side toward the exit side, the speed of the output roller decreases from the output rate to approximately the same as the input rate.

11. The tapered line production device of claim 1 wherein the upper line guide member is a wheel, and wherein the lower line guide member is a wheel.

12. The tapered line production device of claim 1 wherein the trolley assembly is moveable along a rail assembly.

* * * * *